Figure 1:
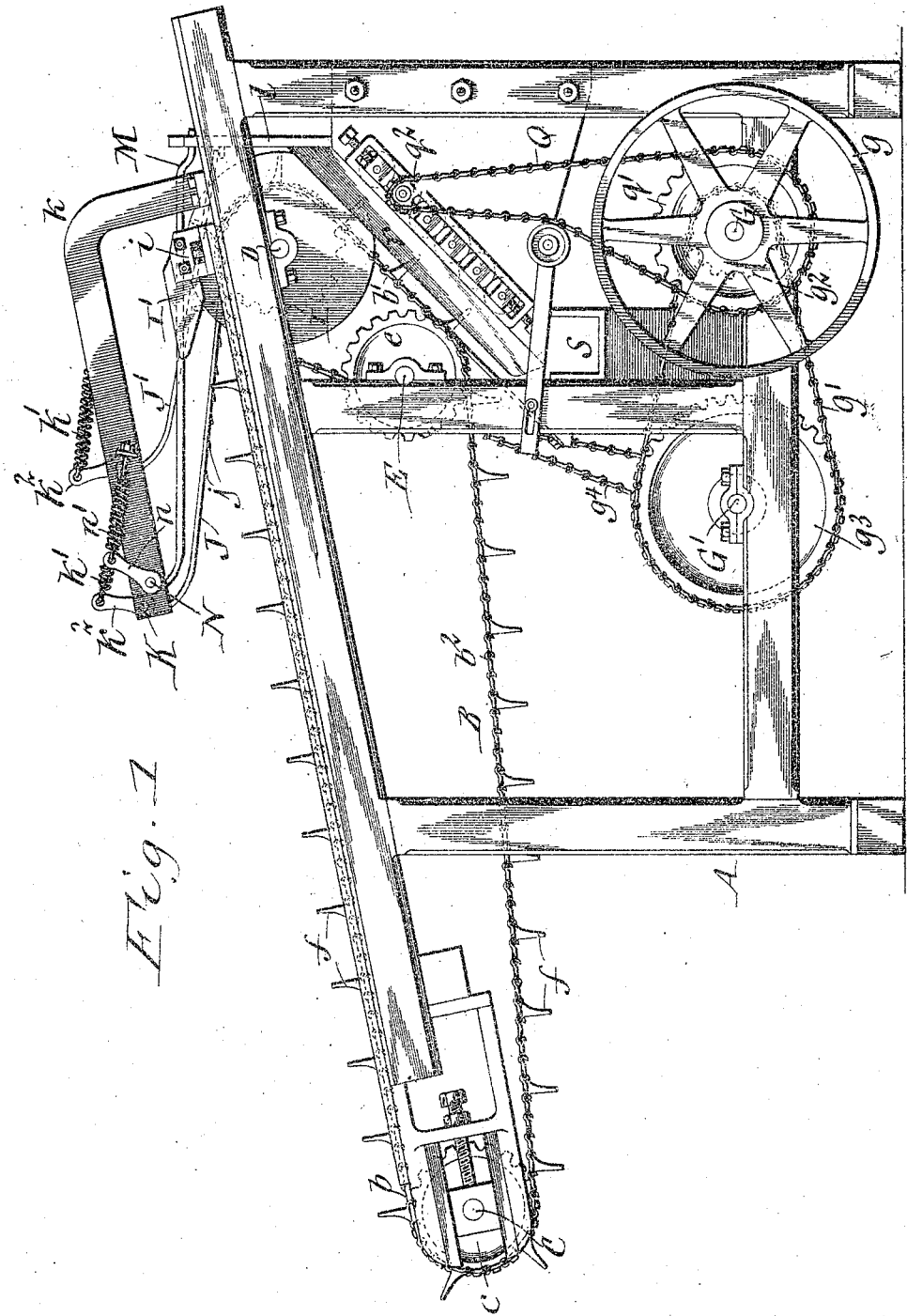

W. H. SELLS.
CORN HUSKING MACHINE.
APPLICATION FILED OCT. 23, 1908.

1,028,616.

Patented June 4, 1912.
4 SHEETS—SHEET 1.

Witnesses:
Richard Sommer.
Gustav W. Hora.

Inventor
William H. Sells
by Geyer & Topff
Attorneys.

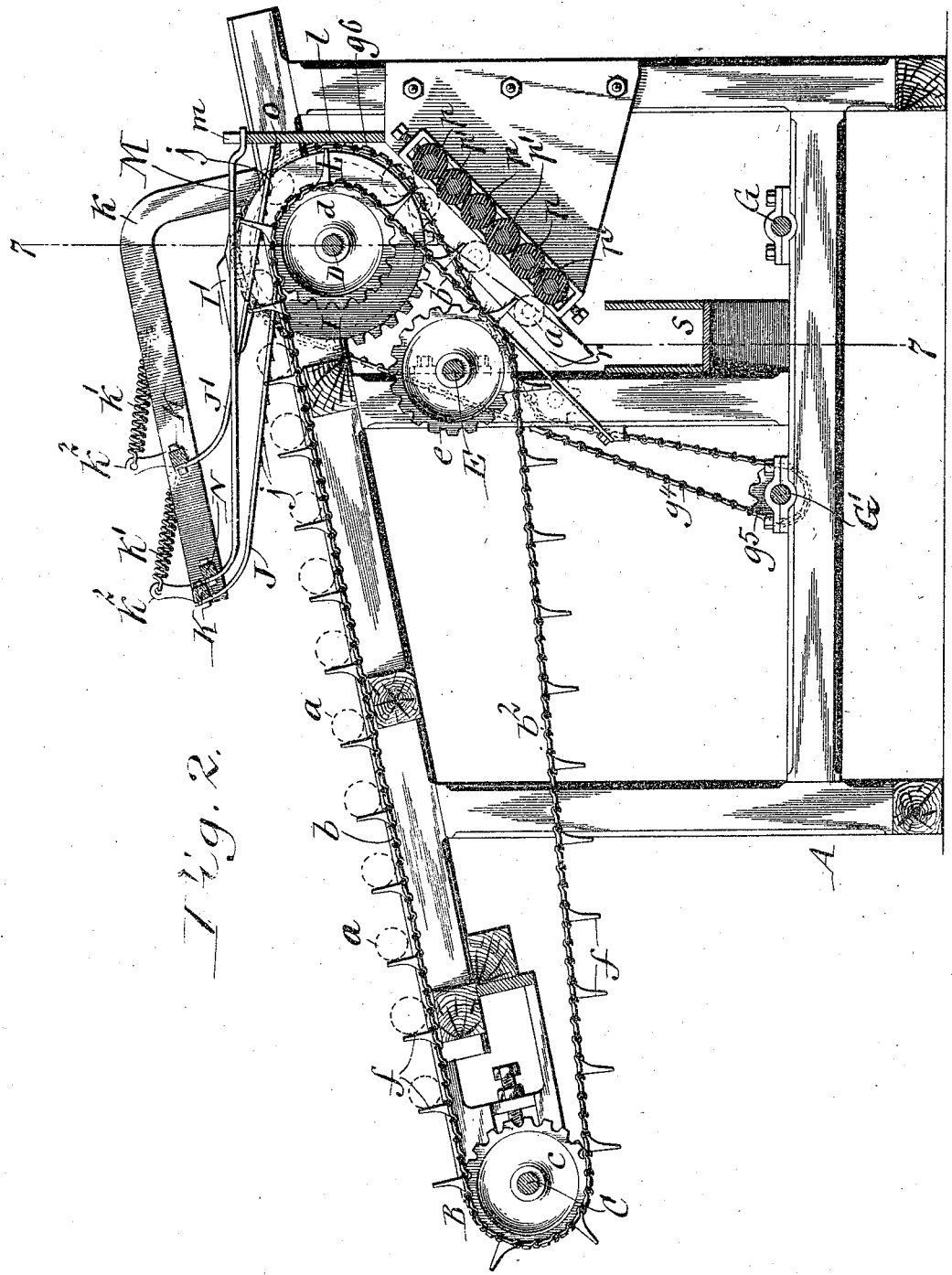

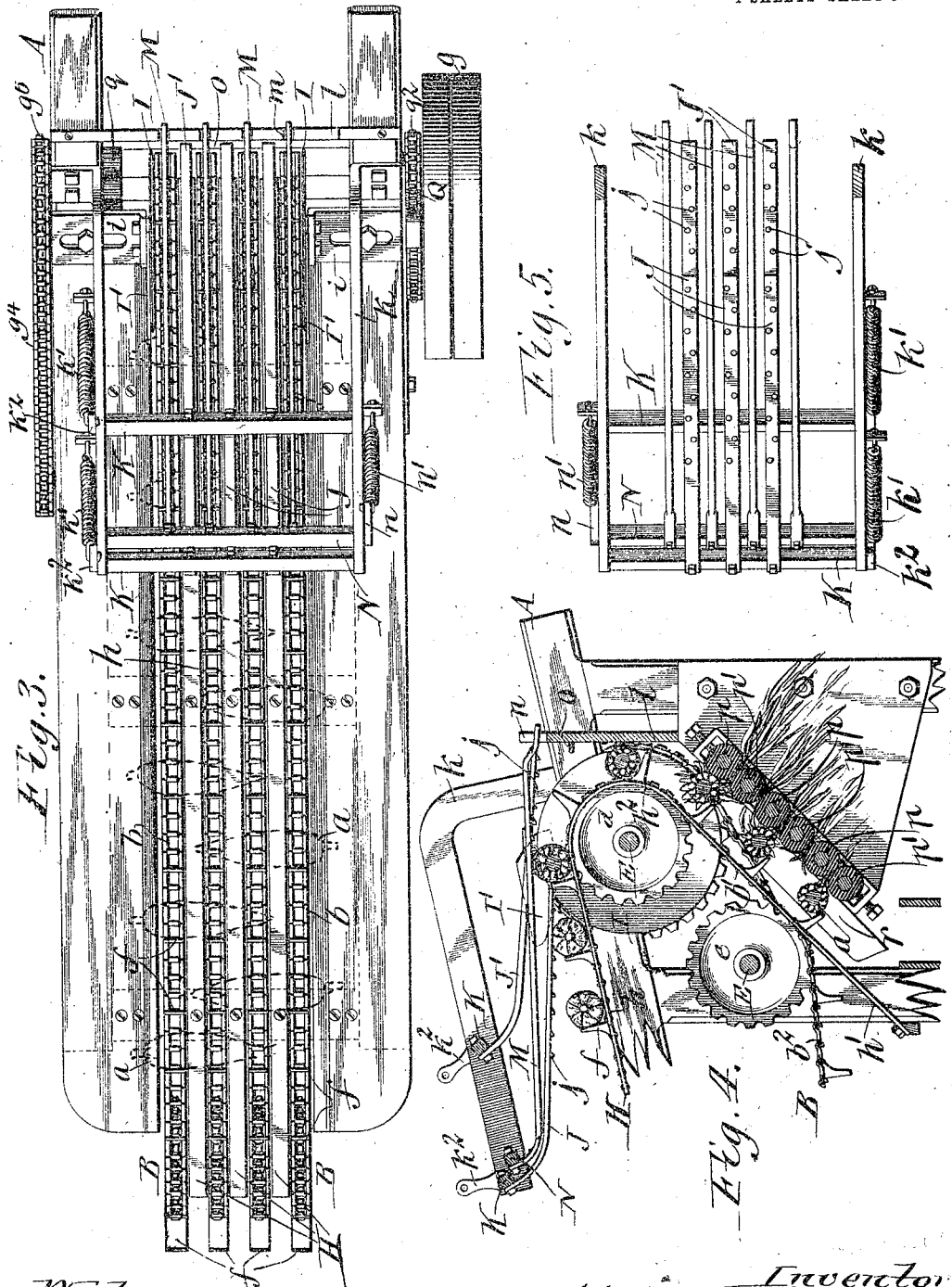

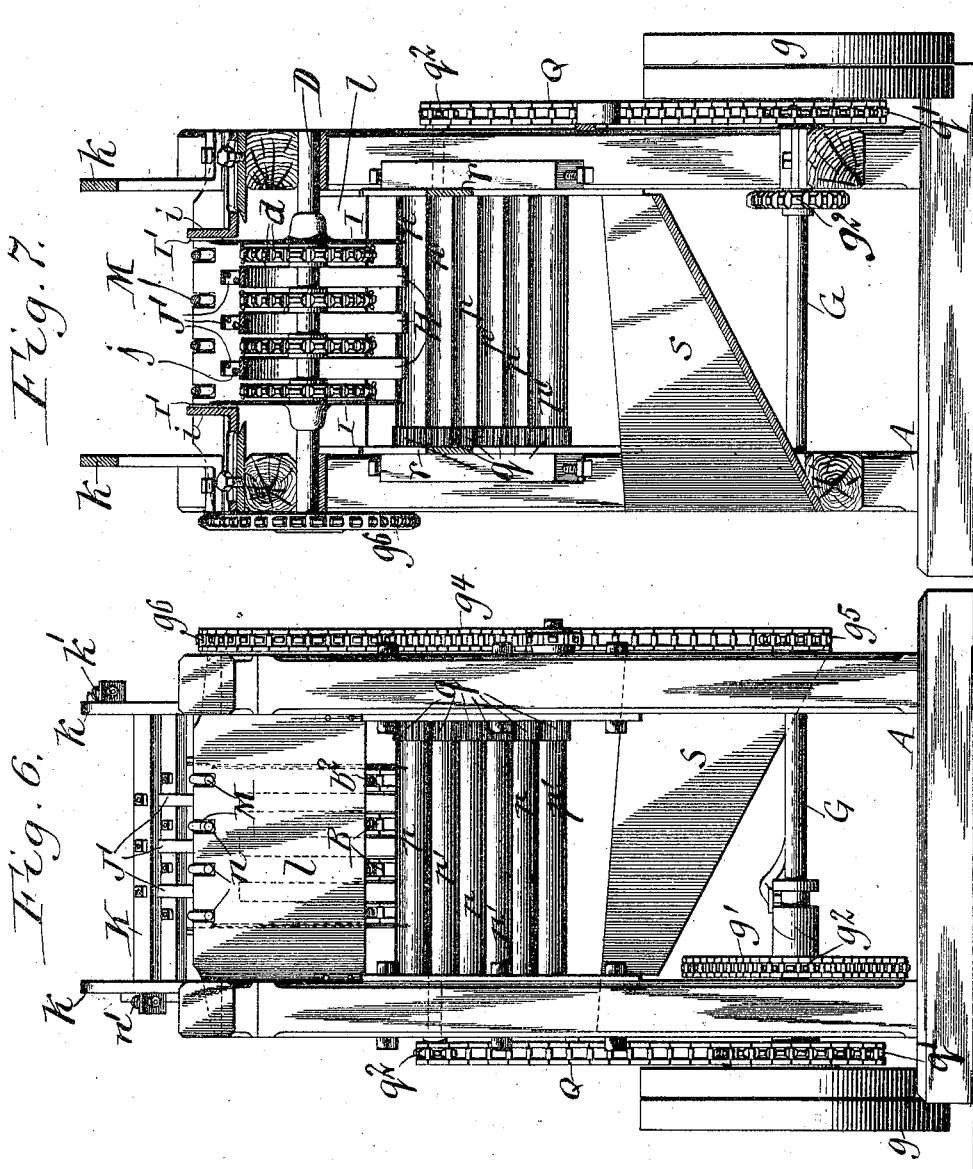

UNITED STATES PATENT OFFICE.

WILLIAM H. SELLS, OF BUFFALO, NEW YORK.

CORN-HUSKING MACHINE.

1,028,616.   Specification of Letters Patent.   Patented June 4, 1912.

Application filed October 23, 1908. Serial No. 459,153.

*To all whom it may concern:*

Be it known that I, WILLIAM H. SELLS, a citizen of the United States, residing at Buffalo, in the county of Erie and State of New York, have invented a new and useful Improvement in Corn-Husking Machines, of which the following is a specification.

This invention relates to a machine whereby the husks are removed from the ears of green corn preparatory to cutting the kernels of corn from the cob and cooking or canning the same.

It is the object of this invention to provide a machine for this purpose which thoroughly removes the husks from the ears of corn with facility and without undue bruising or wasting of the kernels of corn, which is comparatively simple and compact in construction and reliable in operation, and which requires but little power for its operation.

In the accompanying drawings consisting of 4 sheets: Figure 1 is a side elevation of my improved corn husking machine. Fig. 2 is a vertical longitudinal section thereof. Fig. 3 is a top plan view thereof. Fig. 4 is a fragmentary longitudinal section, similar to Fig. 2, and showing some of the parts in a different position. Fig. 5 is a bottom plan view, partly in section, of the means for loosening the husks of the ears of corn. Fig. 6 is a front end view of the machine. Fig. 7 is a vertical cross section in line 7—7, Fig. 2.

Similar letters of reference indicate corresponding parts throughout the several views.

A represents the main frame of the machine which may be of any suitable construction. In the upper part of this frame is arranged the propeller or carrier whereby the ears $a$ of corn are moved successively to the devices which trim or cut off the stub or butt ends thereof and remove the husks therefrom. This propeller or carrier may be variously constructed but is preferably of the endless type and comprises a plurality of chain belts B which are arranged side by side so that they operate together and each of which comprises an upper receiving portion $b$ which preferably moves upwardly and forwardly at an angle or incline, a lower front delivery portion $b^1$ which moves downwardly and rearwardly at an angle from the front end of the receiving portion and a lower rear return portion $b^2$ which moves rearwardly from the lower end of the delivery portion to the outer end of the receiving portion. At the outer ends of the receiving and return portions of the several chain belts the same pass around a plurality of rear sprocket wheels $c$ which are mounted on a transverse shaft C. At the front ends of the receiving portions and the upper ends of the delivery parts of these belts the same pass around a plurality of inner sprocket wheels $d$ which are mounted on a transverse shaft D and at the lower ends of the delivery portions of these belts and the adjacent ends of the return portions thereof, the same pass around a plurality of intermediate sprocket wheels $e$ which are mounted on a transverse shaft E. The shafts C, D, E of the several sets of sprocket wheels $c$, $d$, $e$ are journaled in the adjacent parts of the main frame in any suitable manner. On the outer side of each propelling chain the same is provided at regular intervals with laterally projecting carrying wings, fingers or blades $f$, the wings of the several belts being arranged transversely in line so as to form a plurality of sets each of which is adapted to engage with an ear of corn placed crosswise upon the chain belts and carry the same forwardly to the end trimming and husk removing devices. Various means may be provided for driving this endless carrier; that shown in the drawings being suitable for this purpose and consisting of a horizontal driving shaft G journaled in the lower part of the main frame and provided at one end with a driving pulley $g$, a chain belt $g^1$ passing around a sprocket pinion $g^2$ on the driving shaft and a sprocket wheel $g^3$ on one end of a counter shaft $G^1$ journaled on the lower central part of the main frame, and a chain belt $g^4$ passing around a sprocket pinion $g^5$ on the other end of the counter shaft and a sprocket wheel $g^6$ on the shaft D which carries the front sprocket wheel $d$.

H represents guide bars which are arranged lengthwise in the spaces between the operative parts of the endless carrying belts for assisting the latter in supporting and guiding the ears of corn while the same are moved toward and past the end trimming and husk removing devices. Each of these guide bars has an upper inclined receiving part $h$ arranged in line with the upper receiving parts of the carrying belts and a lower inclined delivery part $h^1$ which is arranged in line with the delivery parts of the adjacent carrying belts and is connected at its upper end with the front end of the upper part $h$ by a curved part $h^2$ which is arranged concentrically in line with that portion of the carrying belts passing around the sprocket wheels $d$, as shown in Fig. 4.

As the ears of corn are carried forwardly by the receiving part of the endless carrier the front sides of the wings of each set engage with the rear sides of the ears of corn and move the same positively forward and during the last part of this forward movement of the ears while under the control of the receiving part of the carrier the stub end of the same is cut off so as to detach the husks from the cob to permit the husks to be more readily removed. If desired, only one cutting device may be provided on one side of the path of the ears of corn adjacent to the front end of the receiving portion of the endless carrier in which case the operator is required to place all the ears crosswise on the carrier with the stub or butt ends projecting in the same direction and in position to be engaged by this cutting device, but it is preferable, as shown in the drawings, to provide two cutting devices which are arranged on opposite sides of the path of the ears of corn so that the stub ends of the ears of corn may be trimmed or cut off when placed upon the carrier with their stub ends projecting in either direction. This arrangement has the further advantage that two operators may be employed for feeding the machine, one operator placing the ears upon the carrier so that the stub ends thereof are cut off by one of the cutting devices, while the other operator places the ears upon the carrier so that the ends thereof project in the opposite direction and are cut off by the other cutting device. In this manner the capacity of the machine can be doubled without any material increase in the cost or size of the machine inasmuch as the corn propelling and husking devices are capable of operating properly on the corn as fast as two operators are able to feed the same.

Although the cutting devices may be varied in their construction, that shown in the drawings has been found suitable in practice and is therefore preferred. Each of the cutting devices shown in the drawings comprises a circular cutting disk or blade I which is secured concentrically to the front shaft D adjacent to the outer side of one of the outer carrying belts and projects with its periphery beyond the face of the carrying belts, and a stationary inclined cutter blade $I^1$ supported on the frame by a bracket $i$ adjacent to the upper part of the cutter disk and forming therewith a V-shaped cutting mouth the sides of which converge forwardly. The cutter disk rotates with the front shaft and as the ears of corn are moved forwardly by the receiving portion of the carrier, the stub ends thereof pass into the mouth between the cutter disk and blade and are severed from the ear, thereby loosening the husks from the cob at the stub end thereof.

While the ears are being carried forwardly in a crosswise position by the receiving part of the carrier, the same are engaged on their sides by a loosening device which operates to turn the ears of corn and loosen the husks thereof around the ears. This loosening device may be varied in its detail construction and still accomplish the same purpose but the construction shown in the drawings has been found effective and is therefore preferred. This preferred form of husk loosener comprises a plurality of longitudinal bars J, $J^1$ which are arranged in two sets, one set in front of the other, above the upper end of the receiving part of the carrier, the front set $J^1$ being arranged to engage the ears of corn after the stub ends have been severed therefrom while the rear set J is arranged to engage the ears of corn before the same reach the trimming or cutting devices. Each of the loosening bars J, $J^1$ is provided on its underside with a longitudinal series of teeth, barbs or spurs $j$ each of which has an abrupt rear side and an inclined front side. As the ears of corn are carried forwardly by the receiving part of the carrier, the upper sides of the ears are engaged by the teeth of the loosening bars, whereby the ears are turned and at the same time the husks are loosened or torn part way from the ears, thereby enabling the husking devices which subsequently operate upon the ears to reliably grasp the husks and pull them from the ears. The lower ends of the loosening bar are free to rise and fall while the upper ends of each set are secured to a transverse rock shaft K which is journaled in an upward extension $k$ of the main frame. Each of the said shafts is turned in the direction for yieldingly holding the free ends of the loosening bars in a forwardly inclined position and in the path of the ears of corn by means of a spring $k^1$ connected at one end with a frame extension and at its upper end with an arm $k^2$ on one end of the respective rock shaft K. As the ears of corn engage the loosening bars the latter are lifted while they operate upon the ears and remain in this position until the ears clear the bars during their continued forward movement.

After the ears of corn have been operated upon by the end trimming and husk loosening devices, the same are discharged downwardly through a throat or guideway L which leads to the devices which operate to remove the husks from the ears of corn. This throat is formed between the front sides of the front sprocket wheels and bars H and an upright guide wall, board or plate $l$ secured transversely to the frame in front of the sprocket wheels.

In order to prevent displacement of the ears of corn while the same are being operated upon by the end trimming devices and until the same are discharged downwardly through the throat, a holding device is provided which may be variously constructed but which preferably consists of a plurality of holding bars M arranged lengthwise over the front end of the receiving part of the carrier and the upper end of the throat, the rear ends of the holding bars being secured to a rock shaft N which is journaled transversely in the frame extensions $k$ and which has an arm $n$ connected by a spring $n^1$ to said extension for holding the bars yieldingly in their depressed position and the front ends of said bars being guided in vertical slots or notches $m$ in the wall $l$ as they adapt themselves to the varying sizes of ears of corn which engage with the same.

The downward movement of the set of loosening bars J is limited by engagement of their lower ends with the upper parts of the guide bars H while the downward movement of the set of loosening bars J' is limited by engagement of their lower ends with a shoulder or shelf $o$ formed on the rear side of the guide wall $l$.

As the ears of corn issue from the lower end of the guide throat or way, the same are received by a husking device which comprises one or more pairs of husking rollers $p, p^1$ which are arranged horizontally and transversely below the throat and opposite the delivery portion of the carrier. As shown in the drawings, three pairs of such rollers are employed but a greater or less number of pairs may be used depending upon the character of the corn and other conditions. These several husking rollers are arranged to form a series or row which inclines from the lower end of the guideway L rearwardly and downwardly parallel with the opposing delivery portion of the endless carrier and the same are rotated so that the opposing surfaces of the rollers of each pair move in opposite directions, so as to grasp the husks. The preferred means shown in the drawings for thus rotating these rollers consists of a train of intermeshing gears $q$ secured to the corresponding ends of the shafts of these rollers, and a chain belt Q passing around a sprocket wheel $q^1$ on the main shaft and a sprocket pinion $q^2$ on the shaft of one of the husking rollers, as shown in Figs. 1, 6 and 7.

As the ears of corn issue from the lower end of the guideway they move over the first pair of husking rollers and these rollers grasp a part of the laterally projecting husks on the ears and strip the same from the ears. As the ears roll successively over the following pairs of husking rollers, the members of each of these pairs in turn grasp remaining portions of the husks and strip the same from the ears so that when the ears escape from the lowermost pair of husking rollers all of the husks have been removed from the ears together with the silk adhering thereto, thereby putting the ears of corn in condition for cutting the kernels from the cob.

If any ears of corn become caught between a pair of rollers owing to the husks sticking firmly thereto, such ears are forcibly or positively advanced and carried downwardly toward the following pairs of rollers by engagement of the front sides of the carrier wings with the rear sides of the ears of corn, as shown by dotted lines in Fig. 2. If on the other hand the husks are removed freely from the ears, the latter are prevented from escaping or passing too rapidly over the rollers by the rear sides of the carrier wings engaging with the front sides of the ears, as shown in Fig. 4, whereby the movement of the ears over the husking rollers is retarded and the same are subjected to the full husking action of the rollers, thereby insuring complete removal of all the husks from the ears. It will thus be noted that the carrier in this manner operates at one time as a positive feeder for compelling the forward movement of the ears of corn, while at another time the same operates as a negative feeder whereby the forward movement of ears of corn is retarded so as to subject the same to a thorough action of the machine.

In order to prevent the escape of the ears of corn laterally from the husking rollers during the operation of removing the husk therefrom, upright guide walls or plates $r$ are arranged along opposite ends of the series of husking rollers, whereby the ears of corn are confined on the same and compelled to move downwardly from the upper or receiving end of this series to the lower or delivery end thereof.

The husks which are removed from the ears by the rollers may be received by any suitable receptacle provided for this purpose at the front end of the machine. The ears of corn which have been freed from husks drop from the lowermost pair of husking rollers into a chute S which is arranged in position to receive the ears of corn and direct them laterally to one side of the machine into any suitable receptacle.

It will be noted that the spaces between the several sets of feed wings in a direction lengthwise of the movement of the endless propeller is greater than the thickness of the ears of corn. By this means the ears of corn after leaving the cutting and husk loosening devices descend by gravity at a greater speed than said propeller from the wings engaging the rear sides of the ears of corn to the wings next in front of the same as the same pass from the receiving portion to the delivery portion of the propelling device. Furthermore the transverse husking rollers together with the opposing delivery portion of the propeller form a guideway or compartment which receives the ears of corn and prevents the same from tipping up endwise or becoming displaced otherwise while the husking rollers are stripping the husks from the ears of corn.

It will be understood from the foregoing that after the cutter has severed the butt end of an ear of corn the husks are free and can be subsequently completely removed easily by the husking rollers and the cutter therefore constitutes means for effecting a partial separation or preliminary loosening of the husks from the ears of corn while the latter are being propelled in one direction by the upper part of the conveyer preparatory to effecting the complete separation of the husks from the ears while the latter are carried in another direction by the lower part of the conveyer.

My improved corn husker is not only exceedingly simple and durable in construction but is very efficient and expeditious in its operation, it requires but little floor space owing to its compactness and it contains few moving parts enabling the same to be operated with comparatively little power.

I claim as my invention:

1. A corn husking machine comprising a belt conveyer having an upper part which conveys the corn in one direction and a lower part which conveys the corn in another direction, means arranged adjacent to the upper part of said conveyer and operating on the corn while on this part to effect a partial separation or preliminary loosening of the husks from the corn, and husking rollers arranged adjacent to the lower part of said conveyer and operating to effect a complete separation or final removal of the husks from the corn while the latter is engaged by the lower part of the conveyer.

2. A corn husking machine comprising a belt conveyer having an upper part which conveys the corn in one direction and a lower part which conveys the corn in another direction, longitudinal bars having teeth arranged adjacent to the upper part of said conveyer and operating on the corn while on this part to effect a partial separation or preliminary loosening of the husks from the corn, and husking rollers arranged adjacent to the lower part of said conveyer and operating to effect a complete separation or final removal of the husks from the corn while the latter is engaged by the lower part of the conveyer.

Witness my hand this 21st day of October, 1908.

WILLIAM H. SELLS.

Witnesses:
 THEO. L. POPP,
 ANNA HEIGIS.